United States Patent
Kato et al.

(10) Patent No.: US 6,910,746 B2
(45) Date of Patent: Jun. 28, 2005

(54) MOTION CONTROL DEVICE OF VEHICLE

(75) Inventors: Toshihisa Kato, Handa (JP);
Masanobu Fukami, Hazu-gun (JP);
Tokio Yakushijin, Ikeda (JP)

(73) Assignees: Advics Co., Ltd., Kariya (JP);
Daihatsu Motor Co., Ltd., Ikeda (JP)

( * ) Notice: Subject to any disclaimer, the term of this patent is extended or adjusted under 35 U.S.C. 154(b) by 0 days.

(21) Appl. No.: 10/491,368

(22) PCT Filed: Jul. 28, 2003

(86) PCT No.: PCT/JP03/09514

§ 371 (c)(1),
(2), (4) Date: Mar. 31, 2004

(87) PCT Pub. No.: WO2004/012972

PCT Pub. Date: Feb. 12, 2004

(65) Prior Publication Data

US 2004/0239179 A1 Dec. 2, 2004

(30) Foreign Application Priority Data

Aug. 6, 2002 (JP) ...................... 2002-228359

(51) Int. Cl.[7] .............................. B60T 8/58
(52) U.S. Cl. ................... 303/140; 303/146; 701/72; 701/78
(58) Field of Search ................. 303/140, 146, 303/147, 148, 139; 701/72, 78; 180/197

(56) References Cited

U.S. PATENT DOCUMENTS 5,694,321 A * 12/1997 Eckert et al. ............. 701/91
5,869,943 A    2/1999 Nakashima et al.
6,315,373 B1 * 11/2001 Yamada et al. ............. 303/191

FOREIGN PATENT DOCUMENTS

| JP | 8-318841 | 12/1996 |
|---|---|---|
| JP | 10-24819 | 1/1998 |
| JP | 10-119743 | 5/1998 |
| JP | 2000-335388 | 12/2000 |
| WO | WO2004/024522 | * 3/2004 |

OTHER PUBLICATIONS

Submitted English translation of JP 10–24819A.*

* cited by examiner

Primary Examiner—Douglas C. Butler
(74) Attorney, Agent, or Firm—Burns, Doane, Swecker & Mathis, LLP

(57) ABSTRACT

A motion control device 10 for a vehicle exerts braking force only on the rear wheel at the inner side of the turning direction for generating a yawing moment on the vehicle only in the turning direction of the vehicle when an absolute value of an actual lateral acceleration Gy is not more than a value Gyth, i.e., when there is a small possibility of the occurrence of an excessive roll angle on the vehicle body, in case where the turning state of the vehicle is the understeer state. On the other hand, it exerts braking force not only on the rear wheel at the inner side of the turning direction, but also on the front and rear wheels at the outer side of the turning direction for generating a yawing moment in the direction opposite to the turning direction too, when the absolute value of the actual lateral acceleration Gy exceeds the value Gyth, i.e., when there is a great possibility of the occurrence of the excessive roll angle on the vehicle body, in case where the turning state of the vehicle is the understeer state.

2 Claims, 9 Drawing Sheets

MOTION CONTROL DEVICE OF VEHICLE

BACKGROUND OF THE INVENTION

1. Field of the Invention

The present invention relates to a motion control device for a vehicle for controlling a motion of a vehicle by controlling braking force exerted on each wheel of front wheels and rear wheels of the vehicle.

2. Description of the Prior Arts

There has conventionally been a demand for controlling a motion of a vehicle so as to prevent the turning state of the vehicle from being unstable due to the occurrence of an excessive roll angle on the vehicle upon the turning of the vehicle. This roll angle depends upon the magnitude of an actual lateral acceleration that is a component of an acceleration actually exerted on the vehicle in the side-to-side direction of the vehicle body, and increases with the increase of the actual lateral acceleration. On the other hand, the magnitude of the actual lateral acceleration exerted on the vehicle is decreased by producing a yawing moment in the direction opposite to the turning direction of the vehicle or by decelerating the vehicle.

From the above, a motion control device for a vehicle disclosed in Japanese Unexamined Patent Application No. HEI10-119743, for example, controls braking force exerted on each wheel for producing a yawing moment in the direction opposite to the turning direction of the vehicle according to a roll angle of the vehicle body, when the vehicle is turning. According to this, the brake force exerted on each wheel can be controlled such that the yawing moment in the direction opposite to the turning direction of the vehicle is increased according to the increase of the roll angle of the vehicle body, when the vehicle is turning, whereby the magnitude of the lateral acceleration exerted on the vehicle is decreased when the roll angle of the vehicle body is increased. As a result, the occurrence of an excessive roll angle on the vehicle body can be prevented.

However, when the braking force of each wheel is controlled by the above-mentioned device, a yawing moment is caused on the vehicle in the direction opposite to the turning direction of the vehicle, so that the turning state of the vehicle is controlled to be always brought into (or to be close to) an understeer state. Consequently, even when the actual lateral acceleration exerted on the vehicle is small and there is low possibility of the occurrence of the excessive roll angle on the vehicle body, the turning radius of the vehicle becomes greater than the expected turning radius, thereby entailing a problem that there may be a case where a tracing performance cannot satisfactorily be maintained.

SUMMARY OF THE INVENTION

The present invention aims to provide a motion control device for a vehicle that can surely prevent an occurrence of an excessive roll angle on a vehicle body while executing a control for suppressing an understeer to thereby satisfactorily maintain a tracing performance.

A feature of the present invention is that a motion control device for a vehicle provided with understeer judging means for judging whether the turning state of the vehicle is an understeer state or not and braking force controlling means that exerts braking force on one or plural predetermined wheels among the front wheels and rear wheels of the vehicle for generating a yawing moment in the turning direction of the vehicle in case where the turning state of the vehicle is judged to be the understeer state comprises actual lateral acceleration related amount obtaining means for obtaining an actual amount of a lateral acceleration related amount, that shows a degree of the turn of the vehicle, as an actual lateral acceleration related amount, wherein the braking force controlling means is configured to exert braking force for generating a yawing moment in the turning direction of the vehicle on the one or plural predetermined wheels and to exert braking force for generating a yawing moment in the direction opposite to the turning direction of the vehicle on one or plural other predetermined wheels, when the absolute value of the actual lateral acceleration related amount exceeds a predetermined value. The "lateral acceleration related amount" is an amount showing a degree of the turn of the vehicle, examples of which include a lateral acceleration (a component of an acceleration caused on the vehicle in the side-to-side direction), yaw rate or roll angle.

According to this configuration, when the absolute value of the actual lateral acceleration related amount is not more than the predetermined value in case where the turning state of the vehicle is the understeer state, i.e., when there is a small possibility of the occurrence of an excessive roll angle on the vehicle body, the braking force is exerted to the vehicle on the one or plural predetermined wheels (for example, at least one wheel of the inner-side front and rear wheels in the turning direction) for generating a yawing moment in the turning direction. This controls the turning direction of the vehicle toward the direction for eliminating the understeer state (an understeer suppressing control is executed), whereby a trace performance can satisfactorily be maintained.

On the other hand, when the absolute value of the actual lateral acceleration related amount exceeds the predetermined value, i.e., when there is a great possibility of the occurrence of the excessive roll angle on the vehicle body, not only the above-mentioned braking force is exerted to the vehicle on the one or plural predetermined wheels for the understeer suppressing control, but also the braking force is exerted to the vehicle on the one or plural other predetermined wheels (for example, at least one wheel of the outer-side front and rear wheels in the turning direction) for generating a yawing moment in the direction opposite to the turning direction. Therefore, the lateral acceleration related amount exerted on the vehicle is reduced due to the action of the yawing moment in the direction opposite to the turning direction, thereby being capable of preventing the occurrence of the excessive roll angle on the vehicle body.

Further, the braking force is simultaneously exerted on the one or plural predetermined wheels and the one or plural other predetermined wheels, so that the sum of the braking force exerted on each wheel is increased. As a result, the total braking force exerted on each wheel effectively functions as decelerating force for decelerating the vehicle, whereby the vehicle is decelerated. Accordingly, the lateral acceleration related amount exerted on the vehicle is also reduced by this, thereby being capable of preventing the occurrence of the excessive roll angle on the vehicle body.

In this case, the braking force controlling means is preferably configured such that it increases the braking force exerted on the one or plural other predetermined wheels according to the increase in the absolute value of the actual lateral acceleration related amount when the absolute value of the actual lateral acceleration related amount exceeds the predetermined value, while it reduces the braking force exerted on the one or plural predetermined wheels according to the increase in the absolute value of the actual lateral acceleration related amount when the absolute value of the actual lateral acceleration related amount exceeds an other predetermined value. The "predetermined value" and the "other predetermined value" may be the same value here.

According to this configuration, as the absolute value of the actual lateral acceleration related amount increases to thereby enlarge the possibility of the occurrence of the excessive roll angle on the vehicle body, the ratio of the yawing moment that is produced in the direction opposite to the turning direction of the vehicle to the yawing moment produced in the turning direction is increased. Therefore, the lateral acceleration related amount exerted on the vehicle is surely reduced, thereby being capable of preventing the occurrence of the excessive roll angle on the vehicle body.

Moreover, it is preferable that the one or plural predetermined wheels on which the braking force controlling means exerts the braking force for generating the yawing moment in the turning direction of the vehicle corresponds to a rear wheel at the inner side in the turning direction, while the one or plural other predetermined wheels on which the braking force controlling means exerts the braking force for generating the yawing moment in the direction opposite to the turning direction of the vehicle corresponds to at least one of the front and rear wheels at the outer side in the turning direction.

When the braking force is exerted on the rear wheel at the inner side in the turning direction of the vehicle, the yawing moment in the turning direction of the vehicle is effectively produced on the vehicle. Further, when the braking force is exerted on the wheel at the outer side in the turning direction of the vehicle, the yawing moment in the direction opposite to the turning direction of the vehicle is produced on the vehicle. Therefore, this configuration can prevent the occurrence of the excessive roll angle on the vehicle body while maintaining a satisfactory tracing performance with simple configuration.

Further, it is preferable that the motion control device for a vehicle has body speed obtaining means for obtaining a body speed of the vehicle, steering operation amount obtaining means for obtaining an operation amount of a steering that changes a turning angle of a steering wheel of the vehicle and target lateral acceleration related amount calculating means for calculating, as a target lateral acceleration related amount, a target value of the lateral acceleration related amount according to a predetermined rule based upon at least the body speed and the steering operation amount, wherein the understeer judging means judges that the turning state of the vehicle is an understeer state when the value obtained by subtracting the absolute value of the actual lateral acceleration related amount from the absolute value of the target lateral acceleration related amount is not less than a positive predetermined value. The "steering operation amount" here is, for example, an operation amount (turning angle) of the steering from a reference position for changing the turning angle of the steering wheel of the vehicle from a reference angle, that is for running the vehicle straight, by the operation (rotation) from the reference position, but not limited thereto.

The turning radius of the vehicle is increased according to the reduction in the absolute value of the lateral acceleration related amount such as the lateral acceleration or the like produced on the vehicle. Therefore, when the absolute value of the target lateral acceleration related amount is greater than the absolute value of the actual lateral acceleration related amount, the actual turning radius of the vehicle becomes greater than the expected turning radius of when the target lateral acceleration related amount is supposed to be produced on the vehicle, whereby the turning state of the vehicle can be judged to be the understeer state in this case. Accordingly, whether the turning state of the vehicle is the understeer state or not can easily and precisely be judged by the configuration of judging the turning state of the vehicle to be the understeer state when the value obtained by subtracting the absolute value of the actual lateral acceleration related amount from the absolute value of the target lateral acceleration related amount is not less than the positive predetermined value.

BRIEF DESCRIPTION OF THE DRAWINGS

FIG. 4 is a flowchart executed by the CPU shown in FIG. 1 for calculating a wheel speed or the like;

DESCRIPTION OF THE PREFERRED EMBODIMENT

Figure 1:
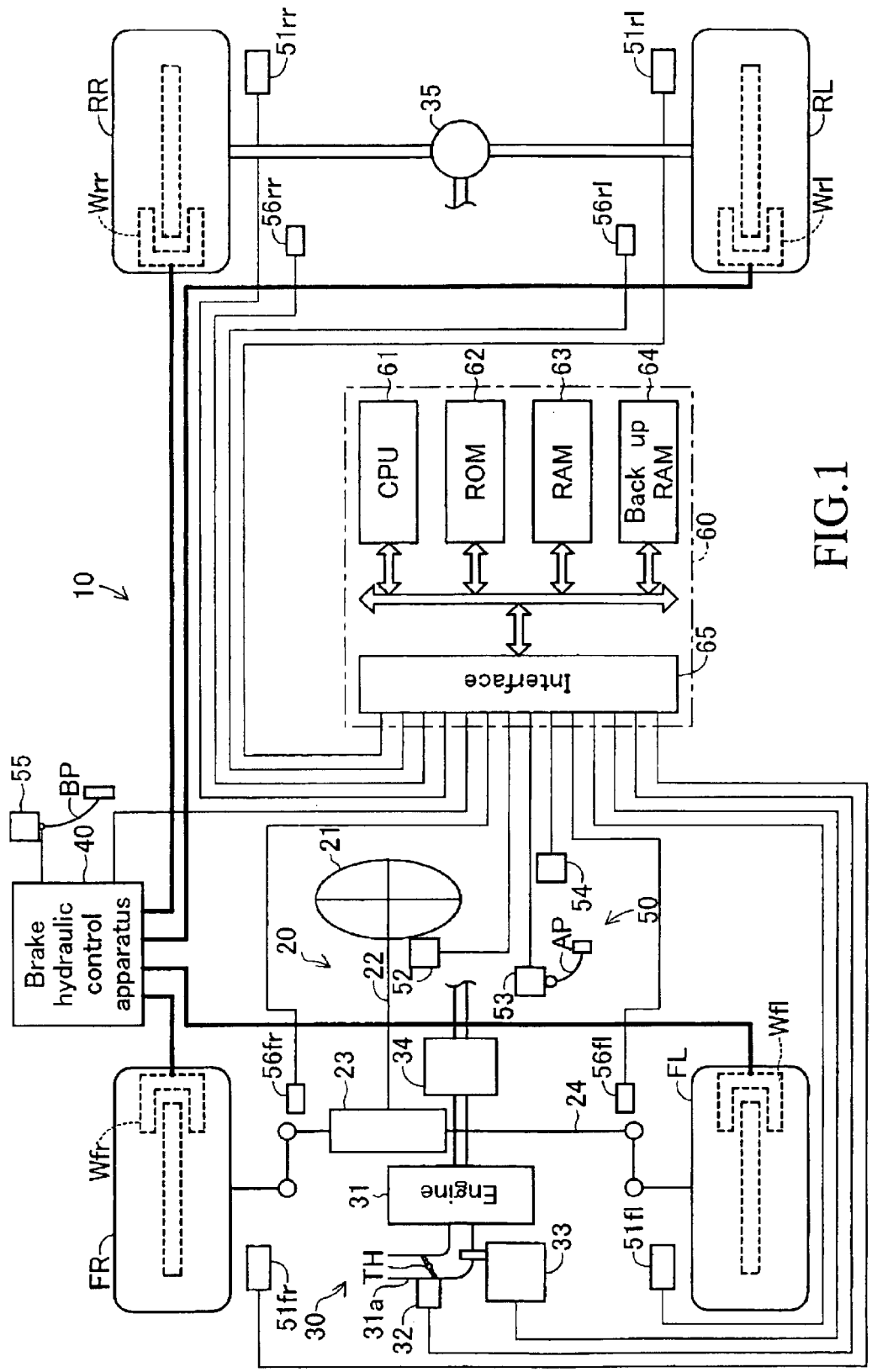
FIG. 1 is a schematic constructional view of a vehicle having mounted thereto a motion control device for a vehicle according to an embodiment of the present invention.

A preferred embodiment of a motion control device for a vehicle according to the present invention will be explained hereinbelow with reference to drawings. FIG. 1 shows a schematic construction of a vehicle provided with a control device 10 for a vehicle according to the embodiment of the invention. This vehicle is a four-wheel drive vehicle using a rear-wheel drive system and having two front wheels (front-left wheel FL and front-right wheel FR) that are steering wheels as well as non-driving wheels and two rear wheels (rear-left wheel RL and rear-right wheel RR) that are driving wheels.

The control device 10 for the vehicle is configured to include a front-wheel steering mechanism 20 for steering the steering wheels FL and FR, a driving force transmission section 30 that produces driving force and respectively transmits this driving force to each driving wheel RL and RR, a brake hydraulic control apparatus 40 for producing braking force by a brake fluid pressure on each wheel, a sensor section 50 composed of various sensors and an electrical control apparatus 60.

The front-wheel steering mechanism 20 is composed of a steering 21, column 22 integrally pivotable with the steering 21, steering actuator 23 linked to the column 22 and a link mechanism 24 including a tie rod that is moved in the side-to-side direction of the vehicle body by the steering actuator 23 and a link that can steer the steering wheels FL and FR by the movement of the tie rod. By this configuration, rotating the steering 21 from its center position (reference position) changes the steering angles of the steering wheels FL and FR from the reference angle at which the vehicle runs straight.

The steering actuator 23 is composed to include a known so-called hydraulic power steering device that generates assisting force for moving the tie rod according to the rotational torque of the column 22, thereby shifting the tie rod from the neutral position to the side-to-side direction of the vehicle by the assisting force in proportion to the steering angle θs from the neutral position of the steering 21. The configuration and operation of the steering actuator 23 are well known, so that the detailed explanation thereof is omitted here.

The driving force transmission section 30 is configured to include an engine 31 that produces driving force, a throttle valve actuator 32 arranged in an inlet pipe 31a of the engine 31 and having a DC motor for controlling an opening TA of a throttle valve TH that can modulate the cross-sectional area of the inlet path, a fuel injection device 33 including an injector that injects fuel to the vicinity of an inlet port not shown of the engine 31, a transmission 34 connected to the output shaft of the engine 31 and a differential gear 36 that suitably distributes and transmits the driving force transmitted from the transmission 34 to rear wheels RR and RL.

Figure 2:
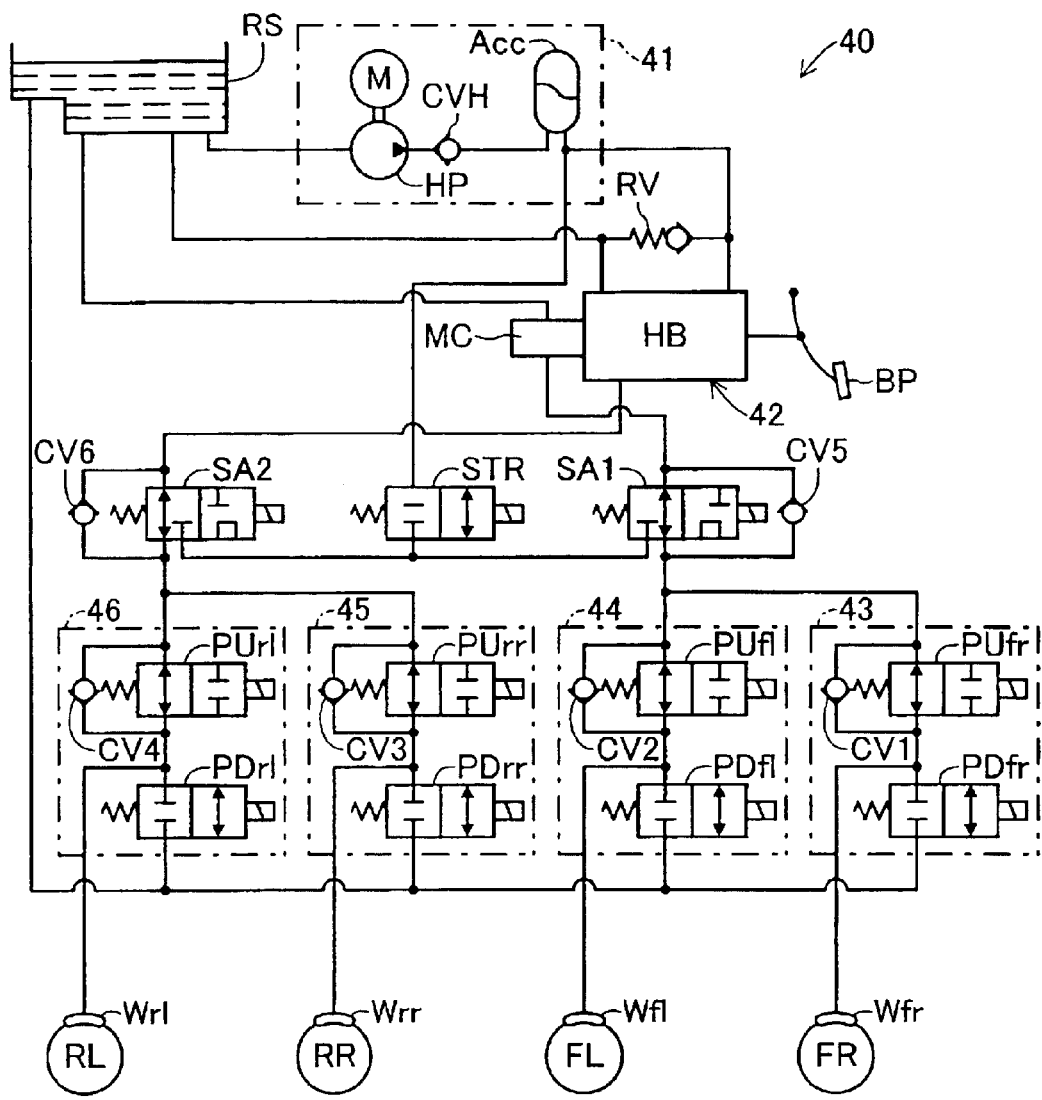
FIG. 2 is a schematic constructional view of a brake hydraulic control device shown in FIG. 1.

The brake hydraulic control apparatus 40 whose construction is schematically shown in FIG. 2 is configured to include a high-pressure generating section 41, a brake fluid pressure generating section 42 that generates brake fluid pressure according to operating force on a brake pedal BP, and an FR brake fluid pressure adjusting section 43, an FL brake fluid pressure adjusting section 44, an RR brake fluid pressure adjusting section 45 and an RL brake fluid pressure adjusting section 46 that are capable of adjusting brake fluid pressure supplied respectively to wheel cylinders Wfr, Wfl, Wrr and Wrl each arranged at each wheel FR, FL, RR and RL.

The high-pressure generating section 41 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 41.

The brake hydraulic generating section 42 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 41 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 43 and the upstream side of the FL brake fluid pressure adjusting section 44. Similarly, a control valve SA2 that is a three-port two-position switching type solenoid-operated valve is arranged between the hydraulic booster HB and each of the upstream side of the RR brake fluid pressure adjusting section 45 and the upstream side of the RL brake fluid pressure adjusting section 46. Further, a change-over valve STR that is a two-port two-position switching type, normally closed, solenoid-operated on-off valve is arranged between the high-pressure generating section 41 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 43 and the upstream section of the FL brake fluid pressure adjusting section 44. When in the second position (in the actuated position), it functions to cut off the communication between the master cylinder MC and each of the upstream section of the FR brake fluid pressure adjusting section 43 and the upstream section of the FL brake fluid pressure adjusting section 44, but to establish the communication between the change-over valve STR and each of the upstream section of the FR brake fluid pressure adjusting section 43 and the upstream section of the FL brake fluid pressure adjusting section 44.

When the control valve SA2 is in the first position in FIG. 2 (in the non-actuated position), it functions to establish communication between the hydraulic booster HB and each of the upstream section of the RR brake fluid pressure adjusting section 45 and the upstream section of the RL brake fluid pressure adjusting section 46. When in the second position (in the actuated position), it functions to cut off the communication between the hydraulic booster HB and each of the upstream section of the RR brake fluid pressure adjusting section 45 and the upstream section of the RL brake fluid pressure adjusting section 46, but to establish the communication between the change-over valve STR and each of the upstream section of the RR brake fluid pressure adjusting section 45 and the upstream section of the RL brake fluid pressure adjusting section 46.

By this operation, master cylinder fluid pressure is supplied to each of the upstream section of the FR brake fluid pressure adjusting section 43 and the upstream section of the FL brake fluid pressure adjusting section 44 when the control valve SA1 is placed at the first position, while high pressure generated from the high-pressure generating section 41 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 45 and the upstream section of the RL brake fluid pressure adjusting section 46 when the control valve SA2 is placed at the first position, while high pressure generated from the high-pressure generating section 41 is supplied thereto when the control valve SA2 is placed at the second position and the change-over valve STR is placed at the second position.

The FR brake fluid pressure adjusting section 43 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 43 and the wheel cylinder Wfr, while it cuts off the communication between the upstream section of the FR brake fluid pressure adjusting section 43 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 43 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 43. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 43. This arrangement brings a rapid reduction of the brake fluid pressure in the wheel cylinder Wfr when the released brake pedal BP is opened with the control valve SA1 placed at the first position.

Similarly, the FL brake fluid pressure adjusting section 44, RR brake fluid pressure adjusting section 45 and RL brake fluid pressure adjusting section 46 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 43 and the FL brake fluid pressure adjusting section 44 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control apparatus 40 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control apparatus 40 can increase only the brake fluid pressure in the wheel cylinder Wfr by a predetermined value by utilizing the high pressure generated from the high-pressure generating section 41 while the brake fluid pressure in the wheel cylinder Wfl is maintained under a state where the brake pedal BP is not operated (is released). As described above, the brake hydraulic control apparatus 40 independently controls the brake fluid pressure in the wheel cylinder of each wheel regardless of the operation on the brake pedal BP, thereby being capable of exerting predetermined braking force on every independent wheel.

Referring again to FIG. 1, the sensor section 50 is composed of wheel speed sensors 51$fl$, 51$fr$, 51$rl$ and 51$rr$ each constructed by a rotary encoder that outputs a signal having a pulse every time each wheel FL, FR, RL and RR rotates at a predetermined angle, a steering angle sensor 52, serving as steering operating amount obtaining means, for detecting the angle of rotation from the neutral position of the steering 21 to output a signal showing a steering angle θs, an accelerator opening sensor 53 that detects an operating amount of an accelerator pedal AP operated by a driver and outputs a signal showing the operating amount Accp of the accelerator pedal AP, a lateral acceleration sensor 54 that detects a lateral acceleration which is a component in the side-to-side direction of a vehicle body of the acceleration actually exerted on the vehicle and outputs a signal showing the lateral acceleration Gy (m/s$^2$) for serving as actual lateral acceleration related amount obtaining means, a brake switch 55 that detects whether the brake pedal BP is operated or not by the driver for outputting a signal showing that the braking operation is performed or not and height sensors 56$fl$, 56$fr$, 56$rl$ and 56$rr$ each detecting a height of a specified section of the vehicle body in the vicinity of each wheel FL, FR, RL and RR from the road surface and outputting each signal showing each height Hfl, Hfr, Hrl and Hrr of each wheel section.

The steering angle θs is set to be "0" when the steering 21 is positioned at the neutral position, set to a positive value when the steering 21 is rotated in the counterclockwise direction (seen by a driver) from the neutral position, and set to a negative value when the steering 21 is rotated in the clockwise direction from the neutral position. Further, the lateral acceleration Gy is set to be a positive value when the vehicle is turning in the leftward direction, while set to be a negative value when the vehicle is turning in the rightward direction.

The electrical control apparatus 60 is a microcomputer including a CPU 61, a ROM 62 that stores in advance a routine (program) executed by the CPU 61, table (look-up table, map), constant or the like, a RAM 63 to which the CPU 61 temporarily stores data as needed, a back-up RAM 64 that stores data with a power supply turned on and holds the stored data even during a period when the power supply is turned off and an interface 65 including an AD converter, those of which are connected to one another with a bus. The interface 65 is connected to the sensors 51 to 55, thereby supplying to the CPU 61 signals from the sensors 51 to 55 and transmitting a driving signal to each solenoid-operated valve and motor M of the brake hydraulic control apparatus 40, the throttle valve actuator 32 and the fuel injection device 33 according to the instruction from the CPU 61.

By this operation, the throttle valve actuator 32 drives the throttle valve TH such that the opening thereof becomes an opening according to the operating amount Accp of the accelerator pedal AP, and the fuel injection device 33 injects fuel in a required amount so as to obtain a predetermined target air-fuel ratio (theoretical air-fuel ratio) concerning intake air mass according to the opening of the throttle valve TH.

[Outline of Motion Control of a Vehicle]

The control device 10 for a vehicle calculates the target lateral acceleration Gyt (m/s$^2$) based upon a following formula (1) that is a theoretical formula as a predetermined rule directed from a vehicle motion model. The target lateral acceleration Gyt is set to the positive value when the vehicle turns in the leftward direction (when the steering angle θs (deg) is a positive value), while it is set to the negative value when the vehicle turns in the rightward direction (when the steering angle θs is a negative value). This theoretical formula is a formula for calculating a theoretical value of the lateral acceleration exerted on the vehicle when the vehicle turns with the steering angle and vehicle body speed constant (upon the normal circular turn).

$$Gyt=(Vso^2 \cdot \theta s)/(n \cdot l) \cdot (1/(1+Kh \cdot Vso^2)) \qquad (1)$$

In the above formula (1), Vso is a calculated estimated body speed (m/s) as described later. Further, n is a gear ratio (constant value) that is a ratio of a change amount of a rotation angle of the steering 21 to a change amount of a turning angle of the steering wheels FL and FR, l is a wheel base (m) of the vehicle that is a constant value determined by the vehicle body, and Kh is a stability factor (s$^2$/m$^2$) that is a constant value determined by the vehicle body.

Further, this device also calculates a lateral acceleration deviation ΔGy (m/s$^2$), based upon the formula (2) described later, that is a deviation between the absolute value of the target lateral acceleration Gyt calculated as described above and the absolute value of the detected actual lateral acceleration Gy obtained by the lateral acceleration sensor 54.

$$\Delta Gy=|Gyt|-|Gy| \qquad (2)$$

Figure 3:
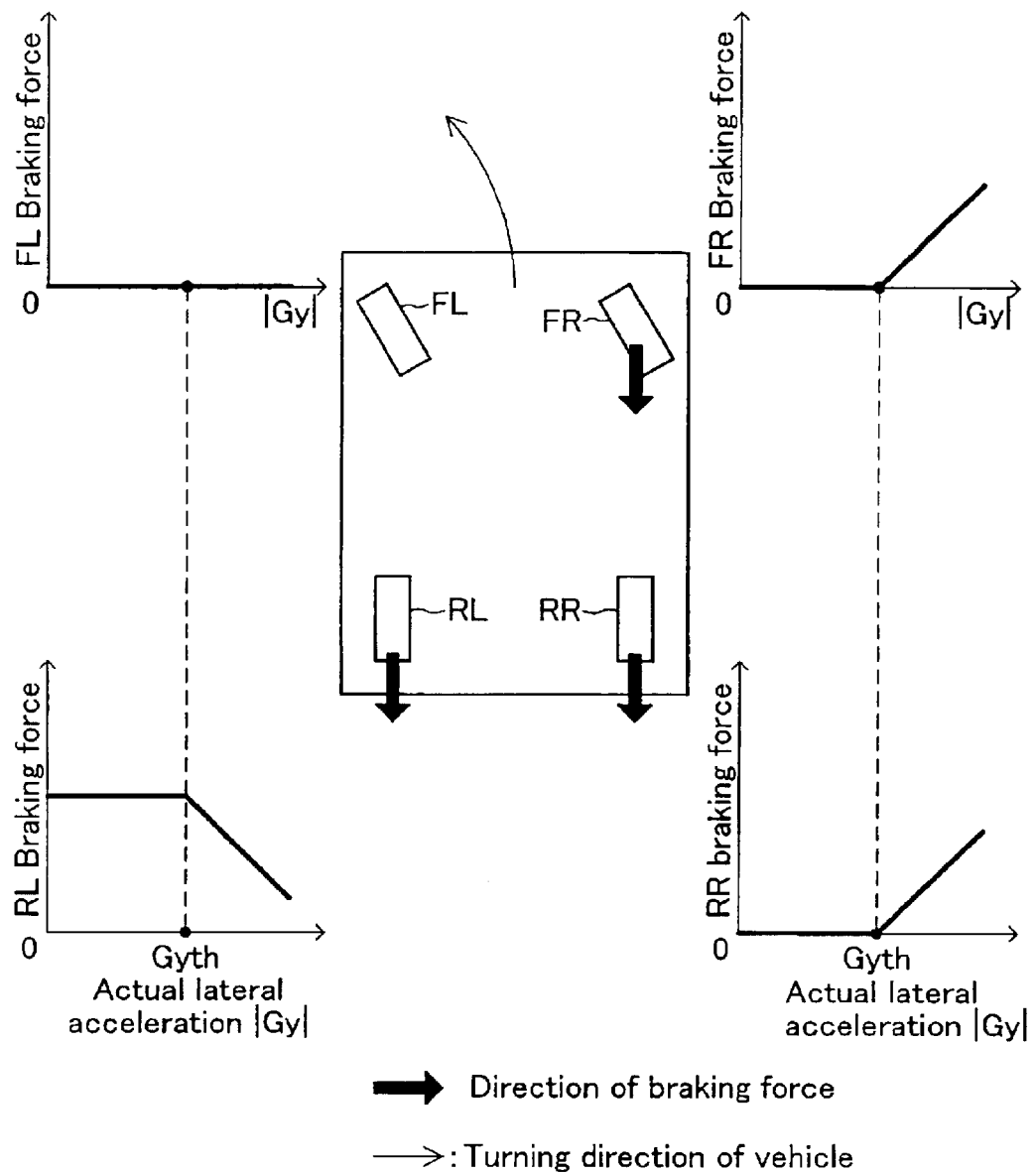
FIG. 3 is a view showing one example of braking force exerted on each wheel of a vehicle that is turning in the leftward direction in an understeer suppressing control.

When the value of the lateral acceleration deviation ΔGy is not less than the positive predetermined value, the vehicle is in a state where the turning radius is greater than the turning radius of when the target lateral acceleration Gyt is assumed to be caused on the vehicle (hereinafter referred to as "understeer state"), whereby this device judges that the turning state of the vehicle is the understeer state and executes an understeer suppressing control for suppressing the understeer state. Specifically, as shown in FIG. 3 that illustrates one example of braking force exerted on each wheel of the vehicle that is turning in the leftward direction in the understeer suppressing control, when the absolute value of the actual lateral acceleration Gy actually exerted on the vehicle is not more than the value Gyth, this device exerts predetermined braking force, that changes according to the value of the lateral acceleration deviation ΔGy and does not depend on the absolute value of the actual lateral acceleration Gy, on only the rear wheel at the inner side of the turning direction (the wheel RL in FIG. 3), thereby forcibly producing a yawing moment on the vehicle in the direction same as the turning direction (in the leftward direction in FIG. 3). This allows to increase the absolute value of the actual lateral acceleration Gy, so that the actual lateral acceleration Gy is controlled to be close to the target lateral acceleration Gyt.

On the other hand, when the absolute value of the actual lateral acceleration Gy exerted on the vehicle exceeds the value Gyth, this device exerts braking force, that changes according to the value of the lateral acceleration deviation ΔGy and is decreased according to the increase in the absolute value of the actual lateral acceleration, on the rear wheel at the inner side of the turning direction (the wheel RL in FIG. 3), thereby forcibly producing a yawing moment, that is decreased according to the increase in the absolute value of the actual lateral acceleration Gy, on the vehicle in the direction same as the turning direction (in the leftward direction in FIG. 3), while this device exerts braking force, that changes according to the value of the lateral acceleration deviation ΔGy and is increased according to the increase in the absolute value of the actual lateral acceleration Gy, on the front and rear wheels at the outer side of the turning direction (the wheels FR and RR in FIG. 3), thereby forcibly producing a yawing moment, that is increased according to the increase in the absolute value of the actual lateral acceleration Gy, on the vehicle in the direction opposite to the turning direction (in the rightward direction in FIG. 3).

According to this configuration, as the absolute value of the actual lateral acceleration Gy increases from the value Gyth to thereby enlarge the possibility of the occurrence of the excessive roll angle on the vehicle body, the ratio of the yawing moment that is produced in the direction opposite to the turning direction of the vehicle to the yawing moment produced in the turning direction is controlled to be increased.

On the other hand, when the value of the lateral acceleration deviation ΔGy is not more than the negative predetermined value, the vehicle is in a state where the turning radius is smaller than the turning radius of when the target lateral acceleration Gyt is assumed to be caused on the vehicle (hereinafter referred to as "oversteer state"), whereby this device judges that the turning state of the vehicle is the oversteer state and executes an oversteer suppressing control for suppressing the overseer state.

Specifically, this device exerts predetermined braking force according to the value of the lateral acceleration deviation ΔGy on only the front wheel at the outer side of the turning direction, thereby forcibly producing a yawing moment on the vehicle in the direction opposite to the turning direction. This allows to decrease the absolute value of the actual lateral acceleration Gy, so that the actual lateral acceleration Gy is controlled to be close to the target lateral acceleration Gyt.

As described above, the understeer suppressing control or the oversteer suppressing control (hereinafter generically referred to as "brake steering control") is executed, whereby this device controls the braking force that should be exerted on each wheel, thereby producing a predetermined yawing moment on the vehicle in the direction that the actual lateral acceleration Gy is close to the target lateral acceleration Gyt calculated as described above, except for the case where the absolute value of the actual lateral acceleration Gy is greater than the value Gyth in the understeer suppressing control.

Further, when any one of an anti-skid control, front-rear braking force distribution control and traction control described later is also required to be executed upon executing the brake steering control, this device finally determines the braking force that should be exerted on each wheel by considering also the braking force that should be exerted on each wheel for executing any one of the above-mentioned controls. The above description is about the outline of the motion control of the vehicle.

(Actual Operation)

Subsequently, the actual operation of the control device 10 for a vehicle of the present invention and having the above-mentioned construction will be explained hereinbelow with reference to FIGS. 4 to 8 showing routines with flowcharts executed by the CPU 61 of the electrical control apparatus 60. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like. For example, the wheel speed Vw comprehensively represents the front-left wheel speed Vwfl, front-right wheel speed Vwfr, rear-left wheel speed Vwrl and rear-right wheel speed Vwrr.

Figure 4:
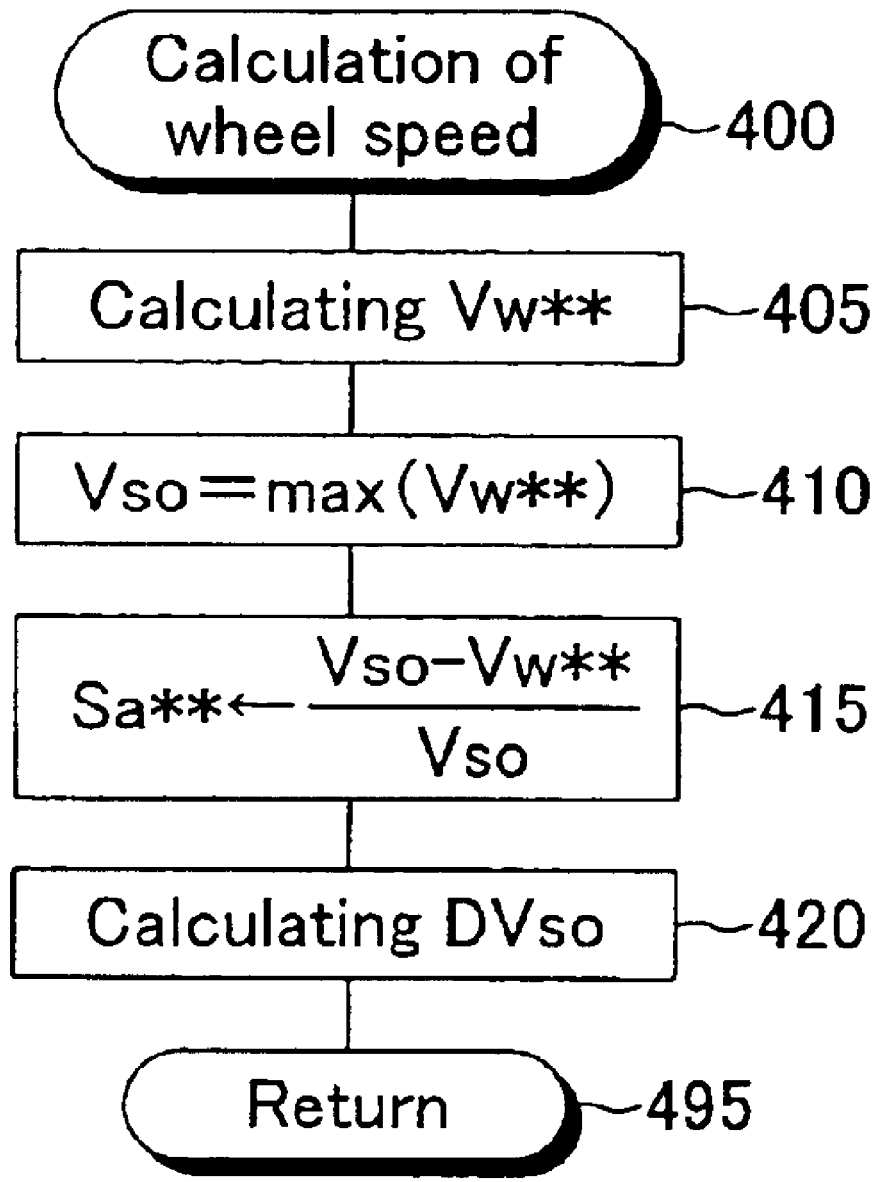

The CPU 61 repeatedly executes a routine shown in FIG. 4 for calculating the wheel speed Vw or the like once every predetermined period. Accordingly, the CPU 61 starts the process from a step 400 at a predetermined timing, and then proceeds to a step 405 to respectively calculate the wheel speed (outer peripheral speed of each wheel) Vw of each wheel FR or the like. Specifically, the CPU 61 calculates the respective wheel speeds Vw of each wheel FR or the like based upon a time interval of a pulse possessed by a signal outputted from each wheel speed sensor 51.

Then, the CPU 61 moves to a step 410 to calculate the maximum value among the wheel speeds Vw of each wheel FR as the estimated body speed Vso. It is to be noted that the average value of the wheel speeds Vw of each wheel FR may be calculated as the estimated body speed Vso. The step 410 corresponds to body speed obtaining means.

Then, the CPU 61 moves to a step 415 to calculate an actual slip ratio Sa of every wheel based upon the estimated body speed Vso calculated at the step 410, the value of the wheel speeds Vw of each wheel FR or the like calculated at the step 405 and the formula described in the step 415. This actual slip ratio Sa** is used for calculating the braking force that should be exerted on each wheel as described later. Then, the CPU 61 proceeds to a step 420 for calculating an estimated vehicle body acceleration DVso that is a time derivative value of the estimated body speed Vso based upon a formula (3) described later.

$$DVso=(Vso-Vso1)/\Delta t \quad (3)$$

In the formula (3), Vso1 is the previous estimated body speed calculated at the step 410 at the time of the previous execution of this routine, while $\Delta t$ is the above-mentioned predetermined time that is the operation period of this routine. Then, the CPU 61 moves to a step 495 to temporarily terminate this routine.

Subsequently explained is the calculation of the lateral acceleration deviation. The CPU 61 repeatedly executes a routine shown in FIG. 5 once every predetermined period. Accordingly, the CPU 61 starts the process from a step 500 at a predetermined timing, and then proceeds to a step 505 to calculate the target lateral acceleration Gyt based upon the value of the steering angle θs obtained by the steering angle sensor 52, the value of the estimated body speed Vso calculated at the step 410 in FIG. 4 and the formula described in the step 505 and corresponding to the right side of the formula (1). The step 505 corresponds to target lateral acceleration related amount calculating means.

Then, the CPU 61 proceeds to a step 510 to calculate the lateral acceleration deviation $\Delta Gy$ based upon the value of the target lateral acceleration Gyt calculated at the step 505, the value of the actual lateral acceleration Gy obtained by the lateral acceleration sensor 54 and the formula described in the step 510 and corresponding to the right side of the formula (2). Then, the CPU 61 proceeds to a step 595 to temporarily terminate this routine.

Subsequently explained is the calculation of the target slip ratio of each wheel required to determine the braking force that should be exerted on each wheel upon executing only the above-mentioned brake steering control. The CPU 61 repeatedly executes a routine shown in FIG. 6 once every predetermined period. Accordingly, the CPU 61 starts the process from a step 600 at a predetermined timing, and then proceeds to a step 605 to determine whether the value of the actual lateral acceleration Gy obtained by the lateral acceleration sensor 54 is not less than "0" or not. If the value of the actual lateral acceleration Gy is not less than "0", the CPU 61 makes "YES" determination at the step 605, and then, moves to a step 610 to set a turning direction indicating flag L to "1". Further, if the value of the actual lateral acceleration Gy is a negative value, the CPU 61 makes "NO" determination at the step 605, and then, proceeds to a step 615 to set the turning direction indicating flag L to "0".

The turning direction indicating flag L represents here that the vehicle turns in the leftward direction or rightward direction. When the value thereof is "1", it indicates that the vehicle turns in the leftward direction, while it indicates that the vehicle turns in the rightward direction when the value thereof is "0". Accordingly, the turning direction of the vehicle is specified by the value of the turning direction indicating flag L.

Then, the CPU 61 moves to a step 620 to calculate a control amount G according to the magnitude of the yawing moment that should be exerted on the vehicle with the brake steering control, based upon the absolute value of the lateral acceleration deviation $\Delta Gy$ and the table described in the step 620. As shown in the table described in the step 620, the control amount G is set to "0" when the absolute value of the lateral acceleration deviation $\Delta Gy$ is not more than the value Gy1. On the other hand, it is set so as to linearly change from "0" to a positive constant value G1 as the absolute value of the lateral acceleration deviation $\Delta Gy$ is changed from the value Gy1 to a value Gy2 when the absolute value of the lateral acceleration deviation $\Delta Gy$ is not less than the value Gy1 and not more than the value Gy2. Further, it is set so as to keep the positive constant value G1 when the absolute value of the lateral acceleration deviation $\Delta Gy$ is not less than the value Gy2. In other words, the brake steering control is not executed when the absolute value of the lateral acceleration deviation $\Delta Gy$ is not less than the value Gy1, while the control amount G is determined according to the absolute value of the lateral acceleration deviation $\Delta Gy$ based upon the table described in the step 620 when the absolute value of the lateral acceleration deviation $\Delta Gy$ is not less than the value Gy1.

Then, the CPU 61 proceeds to a step 625 to calculate coefficients Ki and Ko that are for changing the value of the target slip ratio St of each wheel according to the absolute value of the actual lateral acceleration Gy, corresponding to the braking force that is exerted on each wheel and changes according to the absolute value of the actual lateral acceleration Gy as shown in FIG. 3, based upon the absolute value of the actual lateral acceleration Gy obtained by the lateral acceleration sensor 54 and the table described in the step 625**.

The coefficients Ki and Ko are those used for determining the target slip ratio St of the wheel at the inner side of the turning direction and the target slip ratio St of the wheel at the outer side of the turning direction. The coefficient Ki is set to be a positive constant value when the absolute value of the actual lateral acceleration Gy is not more than the value Gyth, while it is set so as to linearly decrease from the predetermined positive constant value as the absolute value of the actual lateral acceleration Gy is increased from the value Gyth, when the absolute value of the actual lateral acceleration Gy is not less than the value Gyth. On the other hand, the coefficient Ko is set to be "0" when the absolute value of the actual lateral acceleration Gy is not more than the value Gyth, while it is set so as to linearly increase as the absolute value of the actual lateral acceleration Gy is increased from the value Gyth, when the absolute value of the actual lateral acceleration Gy is not less than the value Gyth.

Figure 5:
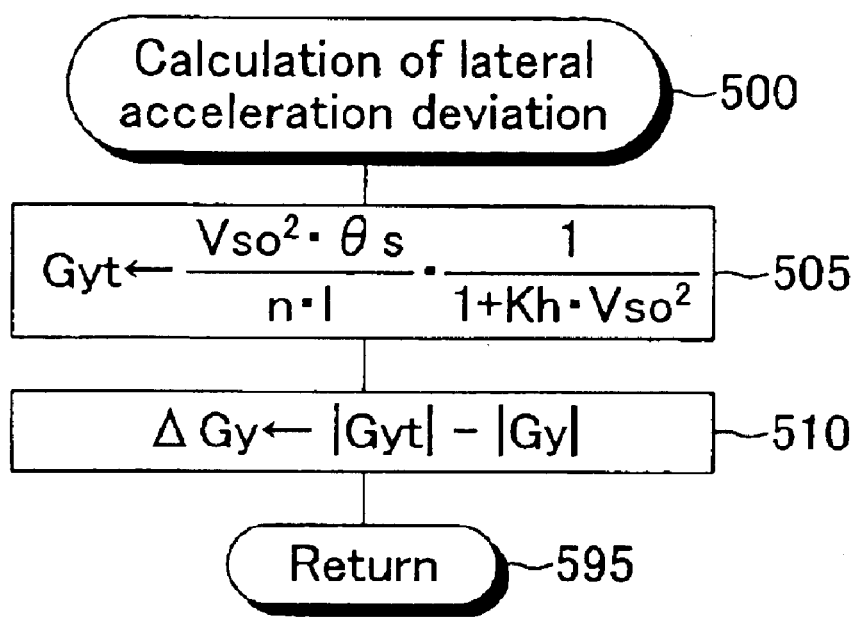
FIG. 5 is a flowchart executed by the CPU shown in FIG. 1 for calculating a lateral acceleration deviation.

Subsequently, the CPU 61 proceeds to a step 630 to determine whether the value of the lateral acceleration deviation ΔGy calculated at the step 510 in FIG. 5 is not less than "0" or not. When the value of the lateral acceleration deviation ΔGy is not less than "0" (actually, when the value of the lateral acceleration deviation ΔGy is not less than the value Gy1), the CPU 61 judges that the vehicle is in the understeer state as previously explained, whereby it moves to a step 635 for calculating the target slip ratio of each wheel upon executing the understeer suppressing control, thus determining whether the value of the turning direction indicating flag L is "1" or not. The step 630 corresponds here to understeer judging means.

When the turning direction indicating flag L is "1" in the judgement of the step 635, the CPU 61 proceeds to a step 640 to respectively set a value obtained by multiplying together the coefficient Ko calculated at the step 625, a coefficient Kf that is a positive constant value and the control amount G calculated at the step 620 as the target slip ratio Sffr of the front-right wheel FR, set a value obtained by multiplying together the coefficient Ki calculated at the step 625, a coefficient Kr that is a positive constant value and the control amount G as the target slip ratio Strl of the rear-left wheel RL and set a value obtained by multiplying together the coefficient Ko, the coefficient Kf and the control amount G as the target slip ratio Strr of the rear-right wheel RR, and set the target slip ratio Stfl of the front-left wheel FL to "0". Then, the CPU 61 proceeds to a step 695 to temporarily terminate this routine.

This process allows to set the target slip ratio, corresponding to the absolute value of the lateral acceleration deviation ΔGy and the absolute value of the actual lateral acceleration Gy for causing the yawing moment in the direction same as the turning direction, to the rear-left wheel RL corresponding to the inside rear wheel in the turning direction in case where the vehicle turns in the leftward direction, while to set the target slip ratio, corresponding to the absolute value of the lateral acceleration deviation ΔGy and the absolute value of the actual lateral acceleration Gy for causing the yawing moment in the direction opposite to the turning direction, to the front-right and rear-right wheels FR and RR corresponding to the outside front and rear wheels in the turning direction.

On the other hand, when the turning direction indicating flag L is "1" in the judgement of the step 635, the CPU 61 proceeds to a step 645 to respectively set a value obtained by multiplying together the coefficient Ko, the coefficient Kf and the control amount G as the target slip ratio Stfl of the front-left wheel FL, set a value obtained by multiplying together the coefficient Ko, the coefficient Kr and the control amount G as the target slip ratio Strl of the rear-left wheel RL and set a value obtained by multiplying together the coefficient Ki, the coefficient Kf and the control amount G as the target slip ratio Strr of the rear-right wheel RR, and set the target slip ratio Sffr of the front-right wheel FR to "0". Then, the CPU 61 proceeds to the step 695 to temporarily terminate this routine.

This process allows to set the target slip ratio, corresponding to the absolute value of the lateral acceleration deviation ΔGy and the absolute value of the actual lateral acceleration Gy for causing the yawing moment in the direction same as the turning direction, to the rear-right wheel RR corresponding to the inside rear wheel in the turning direction in case where the vehicle turns in the rightward direction, while to set the target slip ratio, corresponding to the absolute value of the lateral acceleration deviation ΔGy and the absolute value of the actual lateral acceleration Gy for causing the yawing moment in the direction opposite to the turning direction, to the front-left and rear-left wheels FL and RL corresponding to the outside front and rear wheels in the turning direction.

On the other hand, when the value of the lateral acceleration deviation ΔGy is a negative value in the judgement at the step 630 (actually when the value of the lateral acceleration deviation ΔGy is not more than a value −Gy1), the CPU 61 judges that the vehicle is in the oversteer state as previously explained, whereby it moves to a step 650 for calculating the target slip ratio of each wheel upon executing the oversteer suppressing control, thus determining whether the value of the turning direction indicating flag L is "1" or not.

When the turning direction indicating flag L is "1" in the judgement of the step 650, the CPU 61 proceeds to a step 655 to set a value obtained by multiplying the coefficient Kf that is the positive constant value by the value of the control amount G calculated at the step 620, as the target slip ratio Sffr of the front-right wheel FR, and set the target slip ratios Stfl, Strl and Strr of the other wheels FL, RL and RR to "0". Then, the CPU 61 proceeds to the step 695 to temporarily terminate this routine. This process allows to set the target slip ratio, corresponding to the absolute value of the lateral acceleration deviation ΔGy for causing the yawing moment in the direction opposite to the turning direction, only to the front-right wheel FR corresponding to the outside front wheel in the turning direction in case where the vehicle turns in the leftward direction.

On the other hand, when the turning direction indicating flag L is "0" at the judgement of the step 650, the CPU 61 moves to a step 660 to set a value obtained by multiplying the coefficient Kf by the value of the control amount G calculated at the step 620, as the target slip ratio Stfl of the front-left wheel FL, and set the target slip ratios Stfr, Strl and Strr of the other wheels FR, RL and RR to "0". Then, the CPU 61 proceeds to the step 695 to temporarily terminate this routine. This process allows to set the target slip ratio, corresponding to the absolute value of the lateral acceleration deviation ΔGy for causing the yawing moment in the direction opposite to the turning direction, only to the front-left wheel FL corresponding to the outside front wheel in the turning direction in case where the vehicle turns in the rightward direction. As described above, the target slip ratio of each wheel required to determine the braking force that should be exerted on each wheel upon executing only the brake steering control is determined.

Subsequently explained is a setting of a control mode of the vehicle. The CPU 61 repeatedly executes a routine shown in FIG. 7 once every predetermined period. Accordingly, the CPU 61 starts the process from a step 700 at a predetermined timing, and then proceeds to a step 705 to determine whether the anti-skid control is necessary or not at the present. The anti-skid control is a control, when a specific wheel is locked with the brake pedal BP operated, for decreasing the braking force of the specific wheel. The detail of the anti-skid control is well-known, so that the detailed explanation thereof is omitted here.

Specifically, at the step 705, the CPU 61 judges that the anti-skid control is necessary in case where the state that the brake pedal BP is operated is shown by the brake switch 55 and the value of the actual slip ratio $Sa^{}$ of the specific wheel calculated at the step 415 in FIG. 4** is not less than the positive predetermined value.

When the anti-skid control is judged to be necessary at the judgement of the step 705, the CPU 61 moves to a step 710 to set "1" to a variable Mode for setting a control mode that simultaneously executes the brake steering control and the anti-skid control, and then, proceeds to the following step 750.

On the other hand, when the anti-skid control is judged to be unnecessary at the judgement of the step 705, the CPU 61 moves to a step 715 to determine whether the front-rear braking force distribution control is required or not at present. The front-rear braking force distribution control is a control for decreasing a ratio (distribution) of the braking force of rear wheels to the braking force of front wheels in accordance with a magnitude of a deceleration in the front-rear direction of the vehicle with the brake pedal BP operated. The detail of the front-rear braking force distribution control is well-known, so that the detailed explanation thereof is omitted here.

Specifically, the CPU 61 judges at the step 715 that the front-rear braking force distribution control is needed, in case where the brake switch 55 shows that the brake pedal BP is operated and the case where the estimated body speed DVso calculated at the step 420 of FIG. 4 is a negative value and its absolute value is not less than the predetermined value.

When the front-rear braking force distribution control is needed in the judgement at the step 715, the CPU 61 proceeds to a step 720 where "2" is set to a variable Mode for setting a control mode for executing both the brake steering control and the front-rear braking force distribution control. Then, the CPU 61 proceeds to the next step 750.

When the front-rear braking force distribution control is not needed in the judgement at the step 715, the CPU 61 proceeds to a step 725 for determining whether the traction control is needed or not at present. The traction control is a control for increasing the braking force of the specific wheel or decreasing the driving force of the engine 31 in case where the specific wheel is spun in the direction where the driving force of the engine 31 is generated with the brake pedal BP not operated. The detail of the traction control is well-known, so that the detailed explanation thereof is omitted here.

Specifically, the CPU 61 judges at the step 725 that the traction control is needed, in case where the brake switch 55 shows that the brake pedal BP is not operated and the case where the actual slip ratio $Sa^{}$ of the specific wheel calculated at the step 415 of FIG. 4** is a negative value and its absolute value is not less than the predetermined value.

When the traction control is needed in the judgement at the step 725, the CPU 61 proceeds to a step 730 where "3" is set to a variable Mode for setting a control mode that executes both the brake steering control and the traction control. Then, the CPU 61 proceeds to the next step 750. When the traction control is not needed in the judgement at the step 725, the CPU 61 proceeds to a step 735 for determining whether the brake steering control is needed or not at present. Specifically, the CPU 61 determines that the brake steering control is needed at the step 735 in case where the absolute value of the lateral acceleration deviation ΔGy calculated at the step 510 in FIG. 5 is not less than the value Gy1 in the table described in the step 620 in FIG. 6, since there exists the specific wheel wherein the value of the target slip ratio $St^{}$ set in FIG. 6** is not "0".

When the brake steering control is needed in the judgement at the step 735, the CPU 61 proceeds to a step 740 where "4" is set to a variable Mode for setting a control mode executing only the brake steering control. Then, the CPU 61 proceeds to the next step 750. On the other hand, when it is determined that the brake steering control is not needed in the judgement of the step 735, the CPU 61 proceeds to a step 745 where "5" is set to a variable Mode for setting a non-control mode wherein the vehicle motion control is not executed, and then, proceeds to the next step 750. In this case, the specific wheel that should be controlled is not present.

When the CPU 61 proceeds to the step 750, it sets "1" to a flag CONT corresponding to a wheel to be controlled, while sets "0" to a flag CONT corresponding to a wheel not to be controlled, that is not the wheel to be controlled. The wheel to be controlled at this step 750 is a wheel that is required to control at least one of the corresponding pressure increasing valve $PU^{}$ and the pressure decreasing valve $PD^{}$ shown in FIG. 2.

Figure 6:
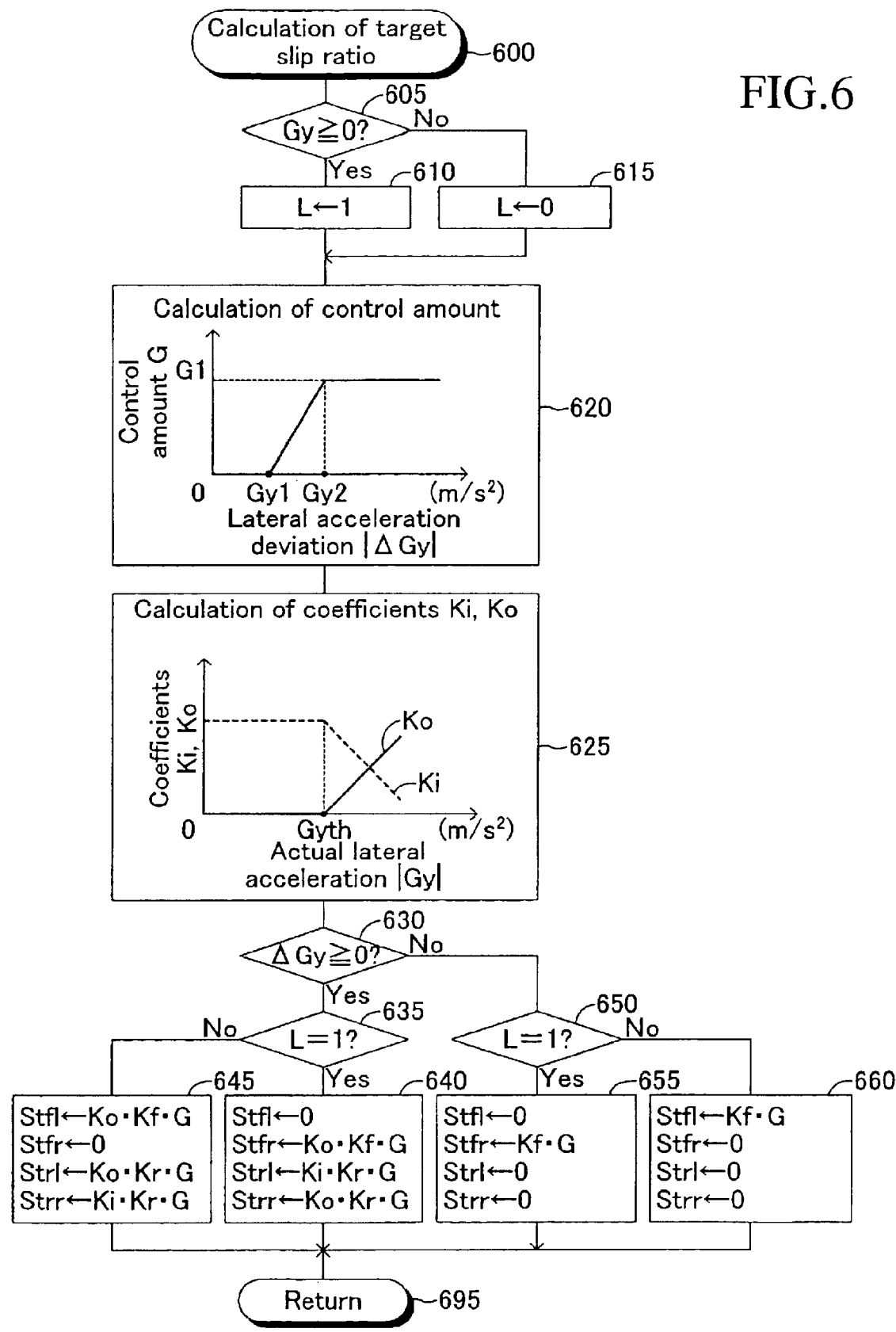
FIG. 6 is a flowchart executed by the CPU shown in FIG. 1 for calculating a target slip ratio.

Accordingly, in case where only the brake fluid pressure in the wheel cylinder Wfr of the front-right wheel FR is required to be increased, such as the case where the brake pedal BP is not operated and the program proceeds to the step 695 in FIG. 6, for example, the control valve SA1, change-over valve STR and pressure increasing valve PUfl shown in FIG. 2 are switched over to the second position and the pressure increasing valve PUfl and the pressure decreasing valve PDfr are respectively controlled, whereby only the brake fluid pressure in the wheel cylinder Wfr is increased by utilizing the high pressure generated from the high-pressure generating section 41 while keeping the brake fluid pressure in the wheel cylinder Wfl to be the fluid pressure at this time. Therefore, not only the front-right wheel FR but also the front-left wheel FL are included in the wheels to be controlled in this case. After executing the step 750, the CPU 61 proceeds to a step 795 for temporarily terminating this routine. As described above, the control mode is specified and the wheel to be controlled is specified.

Subsequently explained is the control of the braking force that should be exerted on each driving wheel. The CPU 61 repeatedly executes the routine shown in FIG. 8 once every predetermined period. Accordingly, the CPU 61 starts the process from a step 800 at a predetermined timing, and then, proceeds to a step 805 to determine whether the variable Mode is "0" or not. If the variable Mode is "0" here, the CPU 61 makes "NO" determination at the step 805, and then, proceeds to a step 810 for turning off (non-actuated state) all electromagnetic solenoids in the brake hydraulic control device 40 since the brake control is not required to be executed to each wheel. Thereafter, the CPU 61 moves to a step 895 to temporarily terminate this routine. This allows to supply to each wheel cylinder W** brake fluid pressure according to the operating force of the brake pedal BP by the driver.

On the other hand, if the variable Mode is not "0" in the judgement at the step 805, the CPU 61 makes "Yes" determination at the step 805, and proceeds to a step 815 for determining whether the variable Mode is "4" or not. If the variable Mode is not "4" (i.e., if the anti-skid control or the like that is other than the brake steering control is needed), the CPU 61 makes "NO" determination at the step 815, and then, proceeds to a step 820 for correcting the target slip ratio St of each wheel that is required upon executing only the brake steering control already set in FIG. 6, with respect to the wheel to be controlled wherein the value of the flag CONT is set to "1" at the step 750 in FIG. 7. Then, the CPU 61 moves to a step 825. By this process, the target slip ratio St** of each wheel already set in FIG. 6 is corrected, every wheel to be controlled, by the target slip ratio of each wheel required for executing the control that is simultaneously executed with the brake steering control and corresponds to the value of the variable Mode.

If the variable Mode is "4" in the judgement at the step 815, the CPU 61 makes "YES" determination at the step 815, and directly moves to the step 825, since it is unnecessary to correct the target slip ratio St of each wheel already set in FIG. 6. Moving to the step 825, the CPU 61 calculates a slip ratio deviation ΔSt every wheel to be controlled based upon the value of the target slip ratio St, the value of the actual slip ratio Sa calculated at the step 415 in FIG. 4 and the formula disclosed in the step 825.

Then, the CPU 61 proceeds to a step 830 for setting a hydraulic control mode with respect to the wheel to be controlled every wheel to be controlled. Specifically, every wheel to be controlled, the CPU 61 sets the hydraulic control mode to "pressure-up" when the value of the slip ratio deviation ΔSt exceeds the predetermined positive reference value, sets the hydraulic control mode to "keep" when the value of the slip ratio deviation ΔSt is not less than the predetermined negative reference value but not more than the predetermined positive reference value, and sets the hydraulic control mode to "pressure-down" when the value of the slip ratio deviation ΔSt is less than the predetermined negative reference value, based upon the value of the slip ratio deviation ΔSt calculated at the step 825 every wheel to be controlled and the table disclosed in the step 830.

Subsequently, the CPU 61 proceeds to a step 835 where it controls the control valves SA1 and SA2 and the change-over valve STR shown in FIG. 2 based upon the hydraulic control mode set at the step 830 every wheel to be controlled and further it controls the pressure increasing valve PU and pressure reducing valve PD according to the hydraulic control mode every wheel to be controlled.

Specifically, the CPU 61 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the control mode set in FIG. 7 can be achieved. The step 835 corresponds to braking force controlling means.

Figure 7:
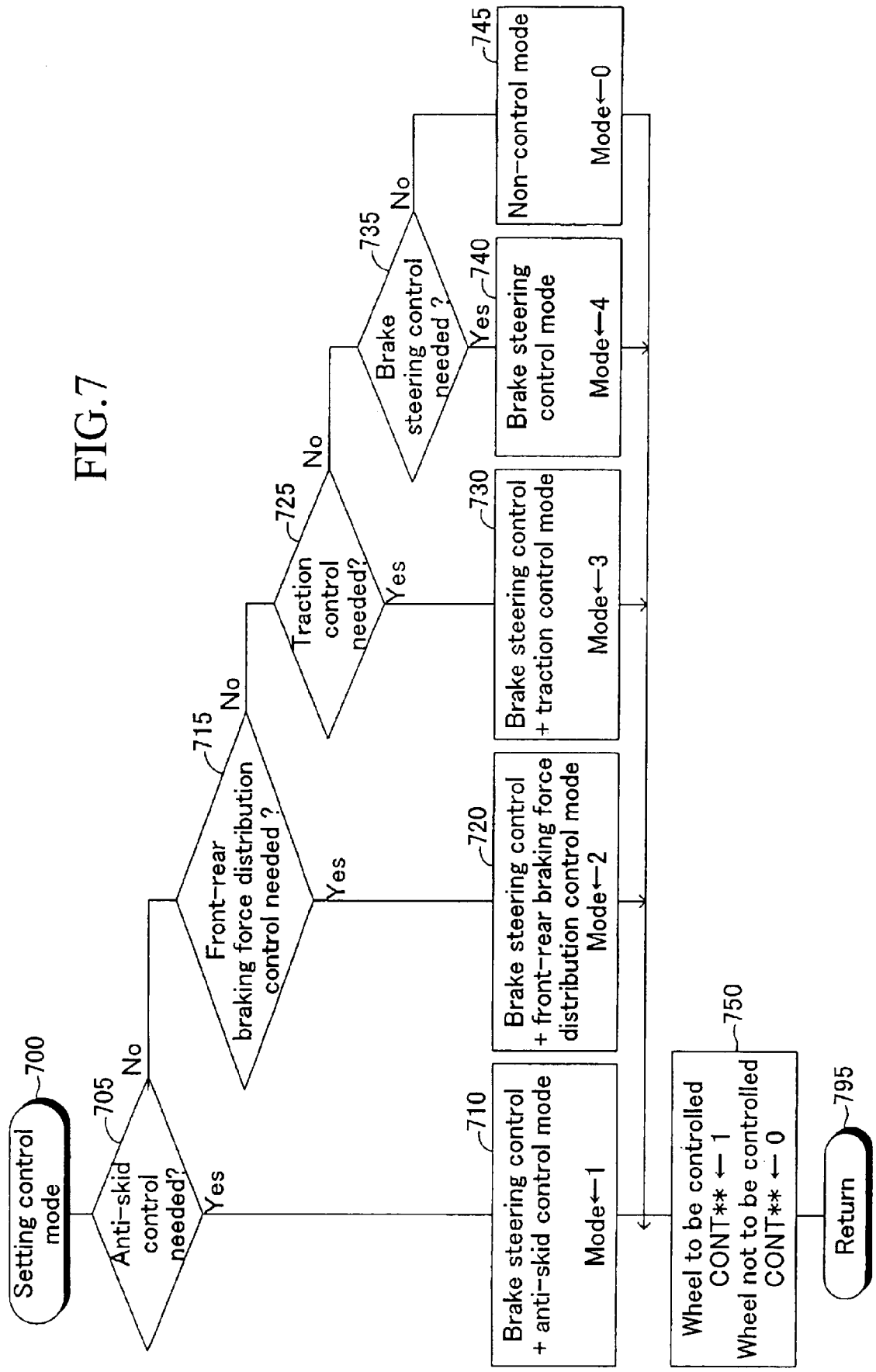
FIG. 7 is a flowchart showing a routine executed by the CPU shown in FIG. 1 for setting a control mode.
Figure 8:
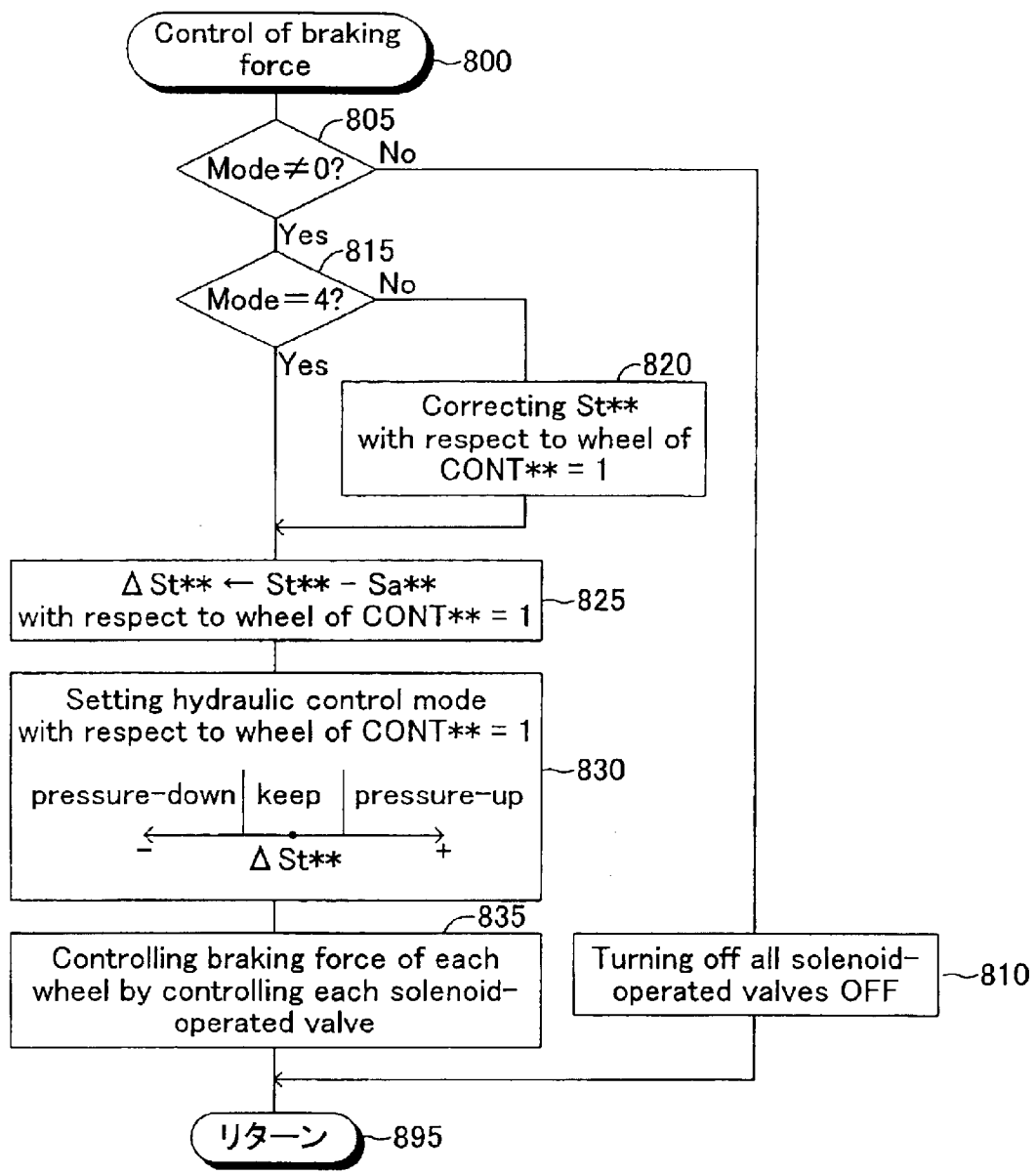
FIG. 8 is a flowchart showing a routine executed by the CPU shown in FIG. 1 for controlling braking force exerted on each wheel.

It is to be noted that, when the control mode set by the execution of the routine of FIG. 7 is the control mode (variable Mode=3) for executing the traction control mode or the control mode (variable Mode=4) for executing only the brake steering control mode, the CPU 61 controls, according to need, the throttle valve actuator 32 such that the opening of the throttle valve TH becomes smaller than the opening according to the operating amount Accp of the accelerator pedal AP by a predetermined amount for reducing driving force from the engine 31. Then, the CPU 61 proceeds to the step 895 for temporarily terminating this routine.

As explained above, according to this configuration, when the absolute value of the actual lateral acceleration Gy is not more than the value Gyth, i.e., when there is a small possibility of the occurrence of an excessive roll angle on the vehicle body, in case where the turning state of the vehicle is the understeer state, the braking force is exerted to the vehicle on the rear wheel at the inner side of the turning direction for generating a yawing moment in the turning direction of the vehicle. This controls the turning direction of the vehicle toward the direction for eliminating the understeer state, whereby a trace performance can satisfactorily be maintained.

On the other hand, when the absolute value of the actual lateral acceleration Gy exceeds the predetermined value Gyth, i.e., when there is a great possibility of the occurrence of the excessive roll angle on the vehicle body, in case where the turning state of the vehicle is the understeer state, not only the above-mentioned braking force is exerted to the vehicle on the rear wheel at the inner side of the turning direction, but also the braking force is exerted to the vehicle on the front and rear wheels at the outer side in the turning direction for generating a yawing moment in the direction opposite to the turning direction. Therefore, the lateral acceleration exerted on the vehicle is reduced due to the action of the yawing moment in the direction opposite to the turning direction, thereby being capable of preventing the occurrence of the excessive roll angle on the vehicle body.

Further, the braking force is simultaneously exerted on the rear wheel at the inner side of the turning direction and the front and rear wheels at the outer side of the turning direction, so that the sum of the braking force exerted on each wheel is increased. As a result, the total braking force exerted on each wheel effectively functions as decelerating force for decelerating the vehicle, whereby the vehicle is decelerated. Accordingly, the lateral acceleration related amount exerted on the vehicle is also reduced by this, thereby being capable of preventing the occurrence of the excessive roll angle on the vehicle body.

Further, as the absolute value of the actual lateral acceleration Gy increases to thereby enlarge the possibility of the occurrence of the excessive roll angle on the vehicle body, the ratio of the yawing moment that is produced in the direction opposite to the turning direction of the vehicle to the yawing moment produced in the turning direction is increased. Therefore, the lateral acceleration exerted on the vehicle is surely reduced, thereby being capable of preventing the occurrence of the excessive roll angle on the vehicle body.

The present invention is not limited to the above-mentioned embodiments. Various modifications can be applied within the scope of the present invention. For example, although the slip ratio of each wheel is used as a control target for controlling the braking force exerted on each wheel of the vehicle in the above-mentioned embodiment, any physical quantity such as brake fluid pressure in the wheel cylinder W** of each wheel may be used as a control target, so long as it is physical quantity that changes according to the braking force exerted on each wheel.

Moreover, the absolute value of the actual lateral acceleration Gy of when the value of the coefficient Ki calculated at the step 625 in FIG. 6 starts to decrease from the predetermined positive constant value and the absolute value of the coefficient Ko calculated at the step 625 in FIG. 6 starts to increase from "0" are set to be the same value Gyth in the above-mentioned embodiment, but each value may be different from each other.

Further, although the values of the coefficient Ki and Ko calculated at the step 625 in FIG. 6 are varied according to the absolute value of the actual lateral acceleration Gy in the above-mentioned embodiment, it may be configured such that the values of the coefficient Ki and Ko may be varied according to an absolute value of a roll angle θroll caused on the vehicle body.

A specific process in this case will be explained. The CPU 61 repeatedly executes the routine for calculating the roll angle θroll shown in FIG. 9 once every predetermined period. Accordingly, the CPU 61 starts the process from a step 900 at a predetermined timing, and then, proceeds to a step 905 to calculate a vehicle height difference ΔH between the left-side vehicle body and the right-side vehicle body based upon each value of the height Hfl, Hfr, Hrl and Hrr of each wheel section obtained by the height sensors 56fl, 56fr, 56rl and 56rr and the formula disclosed in the step 905.

The vehicle height difference ΔH means here an average value of the vehicle height difference between the front-left vehicle body and the front-right vehicle body and the vehicle height difference between the rear-left vehicle body and the rear-right vehicle body. Further, the height difference ΔH is set to take a positive value when the height at the left-side vehicle body is greater than the height at the right-side vehicle body, i.e., when the vehicle is turning in the leftward direction, while it is set to take a negative value when the height at the left-side vehicle body is smaller than the height at the right-side vehicle body, i.e., when the vehicle is turning in the rightward direction.

Subsequently, the CPU 61 proceeds to a step 910 to calculate the roll angle θroll of the vehicle body based upon the value of the height difference ΔH, the value of the wheel tread T that is a distance between the center lines in the side-to-side direction of the vehicle body on the contact surface of the tire tread of the left and right wheels (e.g., rear-left and rear-right wheels RL, RR) with the road surface and the formula disclosed in the step 910. Thereafter, the CPU 61 moves to a step 995 to temporarily terminate this routine. As apparent from the formula disclosed in the step 910, the sign of the roll angle θroll is the same as the sign of the vehicle height difference ΔH, whereby the roll angle θroll is set to take a positive value when the vehicle is turning in the leftward direction, while it is set to take a negative value when the vehicle is turning in the rightward direction.

Figure 9:
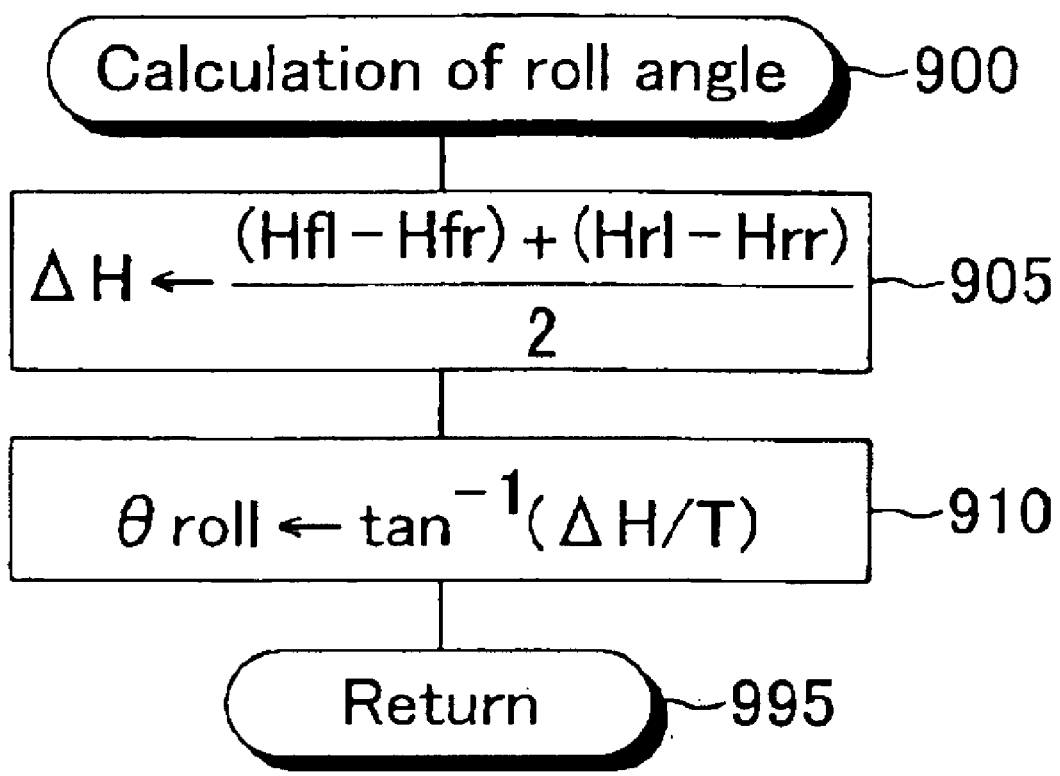
FIG. 9 is a flowchart showing a routine executed by the CPU shown in FIG. 1 for calculating a roll angle.

Then, the CPU 61 takes, instead of the absolute value of the actual lateral acceleration Gy, the absolute value of the roll angle θroll calculated at the step 910 in FIG. 9 as the horizontal axis of the table disclosed in the step 625 in FIG. 6 and takes the value θrolith corresponding to the value Gyth instead of the value Gyth, thereby calculating the coefficients Ki and Ko. As described above, the values of the coefficients Ki and Ko are changed according to the absolute value of the roll angle θroll caused on the vehicle body.

Further, it may be configured such that the values of the coefficients Ki and Ko calculated at the step 625 in FIG. 6 are changed according to the absolute value of the actual yaw rate caused on the vehicle body. In this case, the absolute value of the yaw rate Yr obtained from a yaw rate sensor not shown is used instead of the absolute value of the actual lateral acceleration Gy in the horizontal axis of the table disclosed in the step 625 in FIG. 6, and the value Yrth corresponding to the value Gyth is used instead of the value Gyth, to thereby calculate the coefficients Ki and Ko.

Moreover, it may be configured such that the values of the coefficients Ki and Ko calculated at the step 625 in FIG. 6 are changed according to a road friction coefficient that is a friction coefficient between the road on which the vehicle runs and a tire of the vehicle. In this case, the value of the road friction coefficient $\mu$ calculated by a formula (4) described later is used instead of the absolute value of the actual lateral acceleration Gy in the horizontal axis of the table disclosed in the step 625 in FIG. 6, and the value $\mu$th corresponding to the value Gyth is used instead of the value Gyth, to thereby calculate the coefficients Ki and Ko.

$$\mu = (DVso^2 + Gy^2)^{1/2} \qquad (4)$$

In the formula (4), DVso is an estimated vehicle body acceleration calculated at the step 420 in FIG. 4 and Gy is the actual lateral acceleration obtained from the lateral acceleration sensor 54 as described above.

What is claimed is:

1. A motion control device for a vehicle provided with:

understeer judging means for judging whether the turning state of the vehicle is an understeer state or not; and braking force controlling means that exerts braking force on a rear wheel at an inner side in a turning direction of the vehicle for generating a yawing moment in the turning direction of the vehicle in case where the turning state of the vehicle is judged to be the understeer state, comprising:

actual lateral acceleration related amount obtaining means for obtaining an actual amount of a lateral acceleration related amount, that shows a degree of the turn of the vehicle, as an actual lateral acceleration related amount, wherein the braking force controlling means is configured to exert braking force for generating a yawing moment in the turning direction of the vehicle on the rear wheel at the inner side in the turning direction and to exert braking force for generating a yawing moment in the direction opposite to the turning direction of the vehicle on at least one of the front and rear wheels at the outer side in the turning direction, when the absolute value of the actual lateral acceleration related amount exceeds a predetermined value in the case where the turning state of the vehicle is judged to be the understeer state; and the braking force controlling means increases the braking force exerted on at least one of the front and rear wheels at the outer side in the turning direction according to the increase in the absolute value of the actual lateral acceleration related amount when the absolute value of the actual lateral acceleration related amount exceeds the predetermined value, and reduces the braking force exerted on the rear wheel at the inner side in the turning direction according to the increase in the absolute value of the actual lateral acceleration related amount when the absolute value of the actual lateral acceleration related amount exceeds an other predetermined value, in case where the turning state of the vehicle is judged to be the understeer state.

2. A motion control device for a vehicle claimed in claim 1, further comprising:

body speed obtaining means for obtaining a body speed of the vehicle;

steering operation amount obtaining means for obtaining an operation amount of a steering that changes a turning angle of a steering wheel of the vehicle; and target lateral acceleration related amount calculating means for calculating, as a target lateral acceleration related amount, a target value of the lateral acceleration related amount according to a predetermined rule based upon at least the body speed and the steering operation amount, wherein the understeer judging means judges that the turning state of the vehicle is an understeer state when the value obtained by subtracting the absolute value of the actual lateral acceleration related amount from the absolute value of the target lateral acceleration related amount is not less than a positive predetermined value.

* * * * *